(12) United States Patent
Schuler

(10) Patent No.: US 6,274,260 B1
(45) Date of Patent: Aug. 14, 2001

(54) PLANT WITH HIGH TEMPERATURE FUEL CELLS I

(75) Inventor: Alexander Schuler, Weisslingen (CH)

(73) Assignee: Sulzer Hexis AG, Winterthur (CH)

( * ) Notice: Subject to any disclaimer, the term of this patent is extended or adjusted under 35 U.S.C. 154(b) by 0 days.

(21) Appl. No.: 09/360,929

(22) Filed: Jul. 26, 1999

(30) Foreign Application Priority Data

Jul. 31, 1998 (EP) .................................. 98810739

(51) Int. Cl.[7] .............................. H01M 8/06; H01M 8/12
(52) U.S. Cl. .............................. 429/19; 429/20; 429/26; 429/32
(58) Field of Search .............................. 429/12, 13, 17, 429/19, 20, 26, 30, 31, 32

(56) References Cited

U.S. PATENT DOCUMENTS

| 5,079,105 | * | 1/1992 | Bossel . |
| 5,486,428 | * | 1/1996 | Gardner et al. . |

FOREIGN PATENT DOCUMENTS

| 266861 A1 | * | 5/1988 | (EP) . |
| 0398111A1 | | 11/1990 | (EP) . |
| 0443241A1 | | 8/1991 | (EP) . |
| 0551054A1 | | 7/1993 | (EP) . |
| 0635896A1 | | 1/1995 | (EP) . |
| 0673074A1 | | 9/1995 | (EP) . |
| 0780917A1 | | 6/1997 | (EP) . |
| WO 95/10126 | | 4/1995 | (WO) . |

OTHER PUBLICATIONS

Patent Abstracts of Japan, vol. 011, No. 306 (E–546), Oct. 6, 1987 & JP 62 098567 A (Hitachi Ltd), May 8, 1987, Abstract.

* cited by examiner

*Primary Examiner*—Stephen Kalafut
*Assistant Examiner*—Susy Tsang
(74) *Attorney, Agent, or Firm*—Townsend and Townsend and Crew LLP

(57) ABSTRACT

The (1) contains high temperature fuel cells (20) which are arranged with planar design in a centrally symmetrical stack (2). A supply point (5) is provided for a gaseous or liquid fuel (50). In a reformer (4) following the supply point the fuel can be catalytically converted at least partially into CO and $H_2$ in the presence of $H_2O$ and with process heat being supplied. Along the stack axis a central cavity (25) is arranged via which the fuel which is treated in the reformer can be fed into the fuel cells. The reformer is arranged in the central cavity and is formed in such a manner that the heat required for the endothermic reforming processes can be transferred at least partially via radiation from the fuel cells to the reformer.

11 Claims, 3 Drawing Sheets

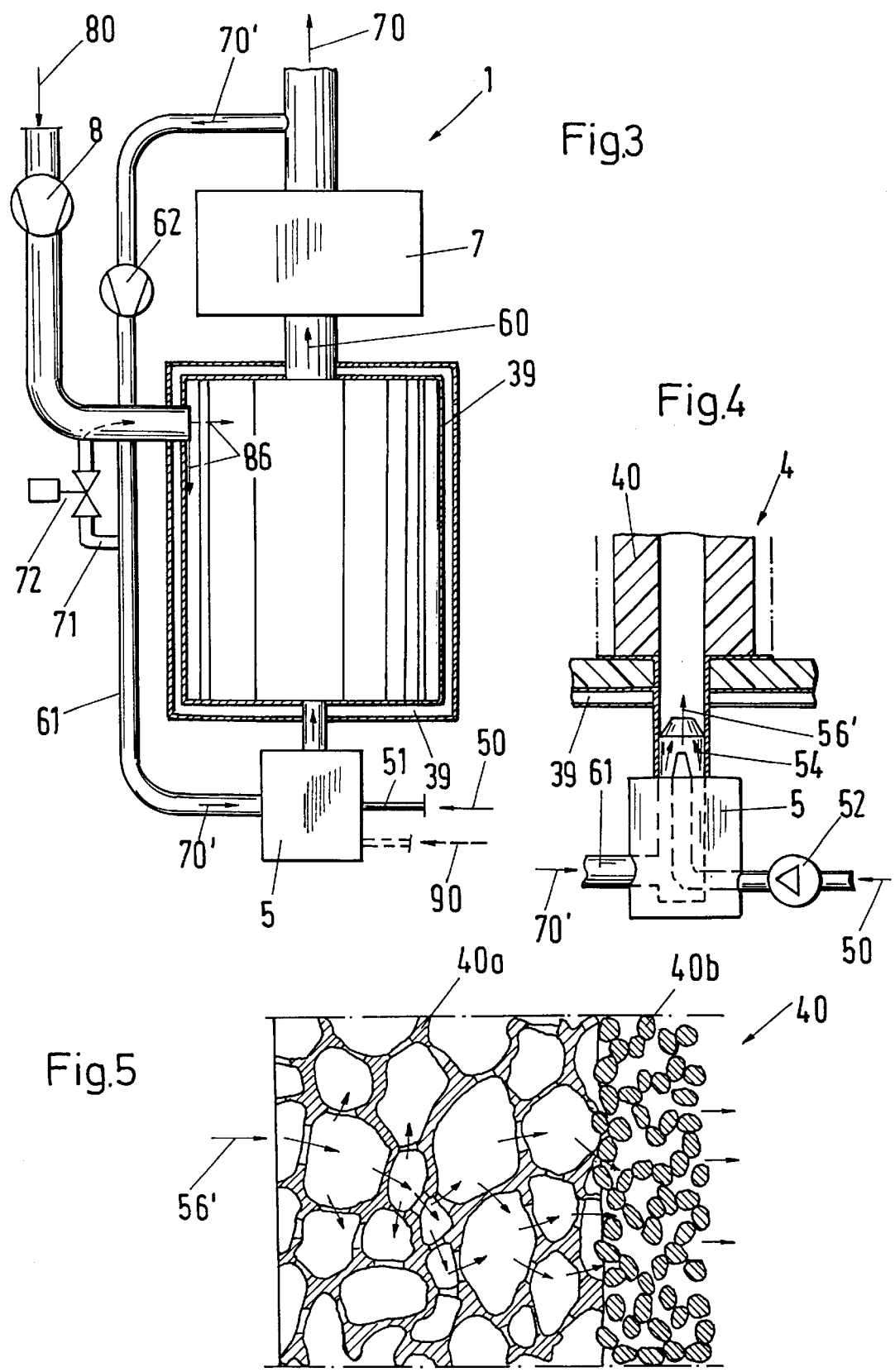

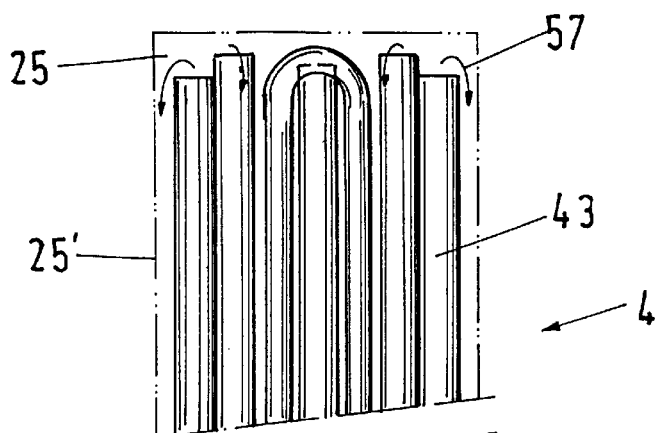
Fig.6
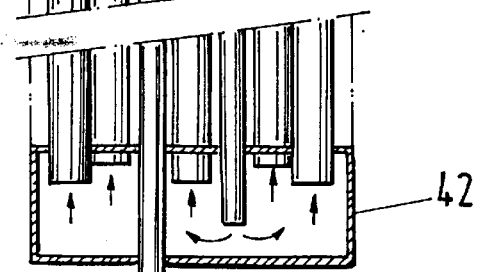
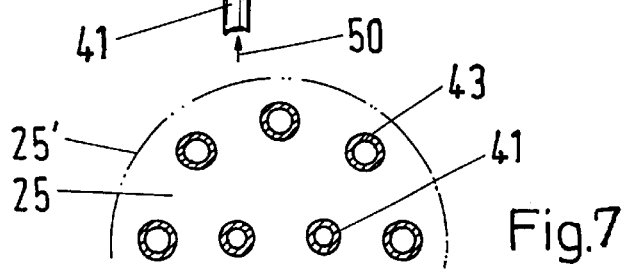
Fig.7
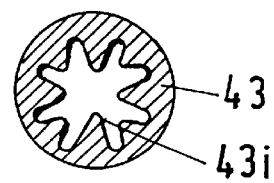
Fig.8
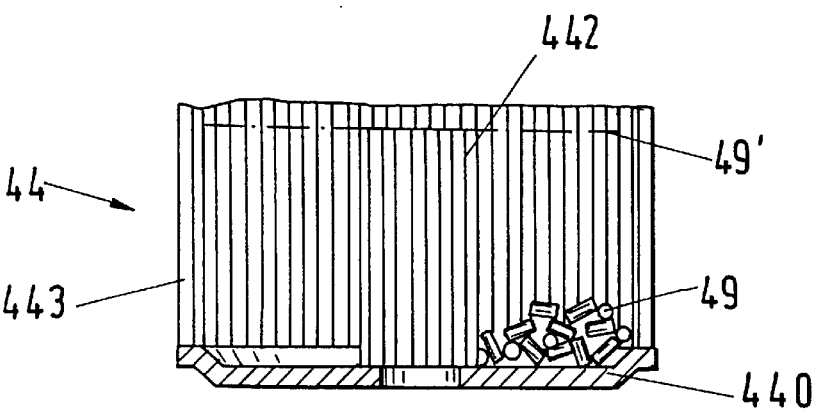
Fig.9
Fig.10

PLANT WITH HIGH TEMPERATURE FUEL CELLS I

The invention relates to a power plant with high temperature fuel cells arranged with a reformer in a central cavity of a stack of the high temperature fuel cells characterized in that the heat required for the endothermic reforming processes is transferred at least partially by radiation from the fuel cells to the reformer.

BACKGROUND OF THE INVENTION

A plant of this kind comprises an apparatus such as is known from EP-A 0 780 917 (=P.6719). This apparatus contains a cell block with fuel cells which is surrounded by a heat insulating sleeve. An afterburner chamber is located between the sleeve and the cell block. A reformer for the treatment of a fuel gas (also called a pre-reformer) is arranged in the sleeve. It is connected to a heat exchanger, by means of which heat for the endothermic reforming process can be supplied to it from the exhaust gases.

In the reforming of the fuel gas, which consists mainly of methane in many applications, the latter is catalytically converted at least partially into CO and $H_2$ in the presence of $H_2O$ and with process heat being supplied. Instead of a gaseous fuel a liquid one can be provided, with it however being possible for the use of a liquid fuel to be connected with additional problems, in that the latter must be fed into the reformer in a suitable manner.

SUMMARY OF THE INVENTION

The object of the invention is to provide a plant with high temperature fuel cells in which the process heat which is required for the reforming of the fuel is won in a manner which is advantageous for the entire process and is supplied to the reforming.

The plant contains high temperature fuel cells that are arranged with planar design in a centrally symmetrical stack. A supply point is provided for a gaseous or liquid fuel. In a reformer following the supply point the fuel can be catalytically converted at least partially into CO and $H_2$ in the presence of $H_2O$ and with process heat being supplied. A central cavity is arranged along the stack axis. Fuel is treated in the reformer and fed into the fuel cells. The reformer is arranged in the central cavity and is designed in such a manner that the heat required for the endothermic reforming processes can be transferred at least partially via radiation from the fuel cells to the reformer.

The reformer of the plant in accordance with the invention is designated in the following as an integrated reformer.

Whereas the known reformer is arranged separately outside the cell blocks in known plants and is heated with exhaust gas, this separate one is replaced in the plant in accordance with the invention by the integrated, radiation-heated reformer. The heat for the reforming reactions is provided via radiation directly from the fuel cell stack. This means that the cells are cooled thereby, and indeed at the location at which they have the highest temperature is known plants. Through the heat sink in the cell stack the amount of cooling air required for the tempering of the stack can be reduced. Through the reduction of the amount of air both the electrical efficiency (lower blower power) and the total efficiency (lower exhaust gas losses) increase. Thanks to an increase of the exhaust gas temperature the size of a heat exchanger which is used for the utilization of waste heat can also be reduced.

Since the heat transfer through radiation grows in proportion to the fourth power of the absolute temperature and since the temperature is high (about 1150–1200 K), high heat flow densities result even at low temperature differences.

BRIEF DESCRIPTION OF THE DRAWINGS

The invention will be explained in the following with reference to the drawings. Shown are:

FIG. 3 is a second embodiment of a plant with exhaust gas feedback, FIG. 4 is a supply point for liquid fuel, FIG. 5 is a section of a gas-permeable structure which can be used as a catalyst carrier of a reformer for liquid fuels, FIGS. 6–8 are side views and details of a second exemplary embodiment for an integrated reformer and FIGS. 9, 10 are elements for a further integrated reformer.

DESCRIPTION OF THE PREFERRED EMBODIMENTS

Figure 1:
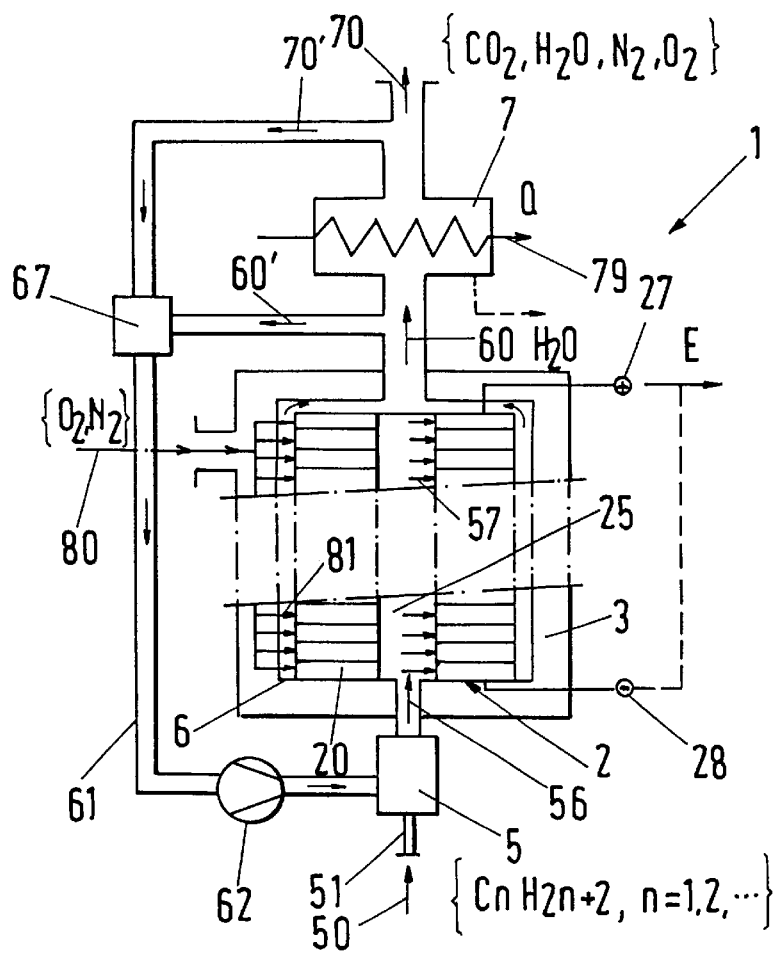
FIG. 1 is a plant in accordance with the invention with high temperature fuel cells, illustrated very schematically.

The plant 1 of FIG. 1 includes a stack 2 with planar, ring-shaped fuel cells 20. Poles 27, 28 give off of an electrical energy E. A sleeve 3 has a non-illustrated inner construction by means of which environmental air 80, 81 is preheated during the operation and is supplied uniformly distributed to the cell stack 2. An afterburner chamber 6 between the cell stack 2 and the sleeve 3 has exhaust gas 60, 70 conducted to it via a heat exchanger 7. Transfer of heating warmth Q to a water circulation heat carrier 79 occurs. A mixing member 67 has hot exhaust gas 60' brought together with cooled down exhaust gas 70'. A feedback line 61 for the exhaust gas and a ventilator 62 return gas to a plant part 5 in which fuel 50 (supply line 51) is mixed with the fed back exhaust gas of line 61. The mixture is treated through reforming following this supply point 5 and the treated fuel 57 is fed into the cells 20, which it flows through as a gas 58.

The reforming is an endothermic process. In accordance with the invention, an integrated reformer 4—see FIG. 2—is arranged in a central cavity 25 of the cell stack 2 along the stack axis. The integrated reformer is designed in such a manner that radiation heat which is given off by the cells 20 can be taken up by it.

Figure 2:
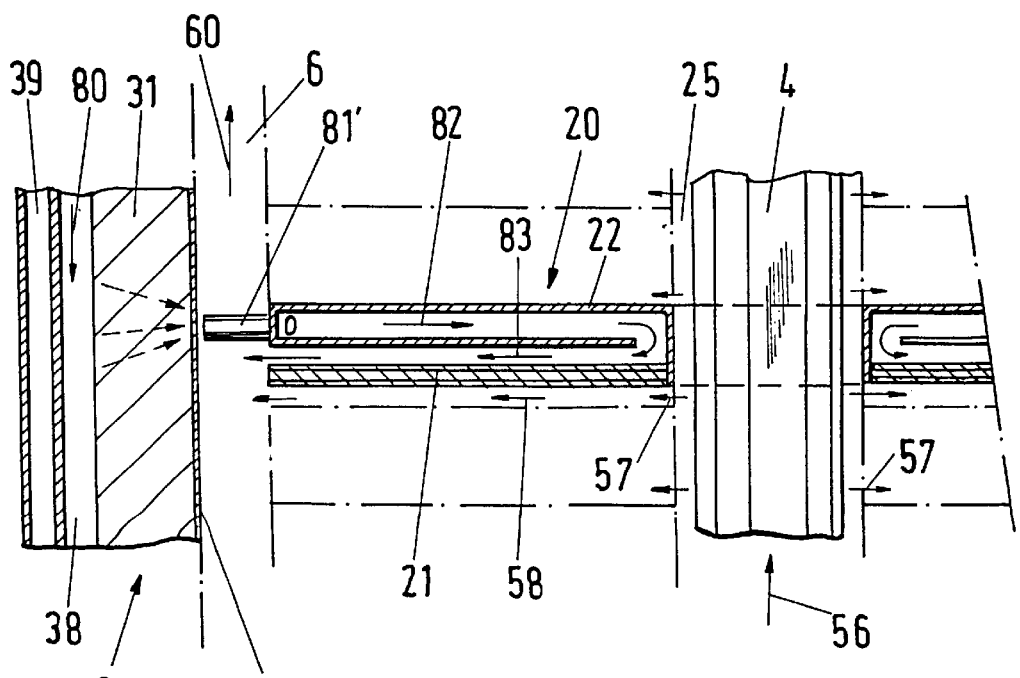
FIG. 2 is a section of the plant with a cross-sectioned fuel cell.

FIG. 2 shows further details: The high temperature fuel cell 20 comprises an electrochemically active plate 21 (with two electrode layers and a solid electrolyte layer lying between them) and an inter-connector 22 which connects the electrochemically active plates 21 of adjacent cells 20 in an electrically conducting manner. The inter-connector 22 is designed as a heat exchanger for the heating of air 82, which is fed in through supply lines 81'. The heated air 83 flows radially outwardly parallel to the gas 58. Constituents of the gas 58 that have not reacted in the cell 20 are burned after joining with the air flow 83 in the afterburner chamber 6. The ring-gap-shaped chamber 6 is surrounded by an air-permeable wall 31, which is sealed off at the inner side with a layer 36. Air 80 is distributed via a second ring-gap-shaped space 38 onto the wall 31, heated in the latter and fed into the inter-connectors 22 through the lines 81'. The sleeve that surrounds the wall 31 and the distributor chamber 38 is closed off against the outside by an evacuated, ring-gap-shaped chamber 39.

During the operation of the plant 1, processes take place in the fuel cells 20 that deliver current and form exhaust gas and waste heat. Exhaust gas 60', 70' which is fed back into the reformer 4 contains $H_2O$, $CO_2$, $O_2$ and $N_2$. The reforming of the fuel 50, which contains hydrocarbons such as e.g. $C_nH_{2+2n}$ with n=1, 2, ..., comprises endothermic reactions such as

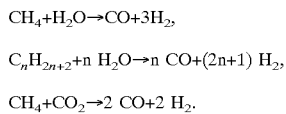

$$CH_4+CO_2 \to 2\ CO+2\ H_2.$$

Parallel to these reactions, partial oxidations, that is, exothermic reactions

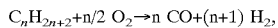

take place. The heat which is liberated in the partial oxidations and the waste heat of the energy delivering processes of the fuel cells supply the process heat for the reforming.

FIG. 3 shows a plant 1 in which a portion of the exhaust gas 70' fed back is admixed to environmental air 80. The environmental air 80, which is forwarded by a blower 8, serves the current delivering processes as a medium which gives off $O_2$ and takes up waste heat. The amount forwarded yields an excess of $O_2$ (relative to the stoichiometric amount required for the processes).

FIG. 4 shows a supply point 5 for a liquid fuel 50 that is fed in by a pump 52. The fuel 50 is sprayed in a nozzle device 54 and mixed with the exhaust gas 70' (or 70' and 60') which is fed back. The mixture which is produced, an aerosol spray 56', is distributed into the reformer 4 which is located in the central cavity 25 of the cell stack 2 (see FIGS. 1 and 2). In the tubular reformer 4 the aerosol spray 56' is treated (through reforming and/or partial oxidation) in a gas-permeable structure 40 which carries catalysts. This structure 40, which is illustrated as a section in FIG. 5, comprises an inner zone 40a and an outer zone 40b in a concentric arrangement. The outer zone 40b is formed uniformly and produces a substantially greater radial flow resistance than the inner one. The inner zone 40a is designed as a droplet precipitator. There the liquid phase of the fuel 50 passes into the gaseous form through evaporation or as a result of chemical reactions. In the outer zone 40b the treatment is continued; at the same time a uniform distribution of the treated gas 57' onto the individual fuel cells 20 takes place through the denser zone 40b.

For example the following materials come under consideration as catalysts for the reforming and/or the partial oxidation; platinum, palladium, ruthenium, rhodium and nickel or a mixture of two or more of these materials. Nickel is however less suitable for the partial oxidation due to soot formation.

In difficult to handle hydrocarbons (gasoline, heating oil, rape oil) an additional water inlet (reference symbol 90 in FIG. 3) can be required in order to be able to eliminate the danger of carbon depositing, i.e. soot formation. Through the additional water inlet practically any desired ratio of the reactions reforming and partial oxidation to one another can be set. Since this ratio is different depending on the fuel, the method can be ideally adapted to the respective fuel. In fuels which tend only slightly to soot formation (natural gas, bio-gas, methanol) an additional water supply can be dispensed with.

The integrated reformer of FIGS 2 and 4 extends substantially over the entire height of the cell stack 2. With a gas-permeable structure 40 it surrounds a tubular distributor channel. This structure 40 has an inner surface, which carries a catalyst, i.e. materials that catalytically activate the reforming. The reformer 4 is designed in such a manner that the flow resistance along the distributor channel is substantially less than radially through the gas-permeable structure 40 and that the radial flow resistance is substantially equally large over the entire reformer length. The treated, gaseous fuel 57 is uniformly distributed onto all cells 20 with this structure 40.

The gas-permeable structure 40, which forms a porous tube, is manufactured of a metallic and/or ceramic material. This tube has for example an open pored foam structure such as is provided in FIG. 5 for the inner zone 40a.

The integrated reformer 4 can for example also be assembled as a bundle of vertical tubes as is illustrated in FIGS. 6 and 7. FIG. 6 shows a side view of the tube bundle, FIG. 7 a cross-section. The lateral boundary of the central cavity 25 is indicated by chain dotted lines 25'. During the operation of the plant in accordance with the invention the gaseous fuel 50 which is fed in is pre-heated in a tube 41 which is shaped like a hair-needle. Afterwards the pre-heated gas is distributed via a container 42 into a plurality of tubes 43. The catalytic processes of the conversion take place in these tubes 43. In order that a sufficiently large surface is available for these processes the tubes 43 can be provided with a "fractal" inner surface 43i as is indicated in FIG. 8. This surface 43i can be coated with a wash coat carrying the catalysts.

The tubes 43 open at their upper ends in the central cavity 25, via which the gas 57 which is treated in the reformer 4 is distributed into the fuel cells 20. The volume of the central cavity 25 should be substantially greater than the total volume of the tubes 41, 43 so that a largely uniform distribution of the treated gas 57 onto the fuel cells 20 results.

As is illustrated in FIGS. 9 and 10 the integrated reformer 4 can be fitted together from stack elements 44, with these stack elements in particular being baskets which contain a granulate 49 which is formed as a catalyst carrier. A basket 44 comprises a base 440 with a central aperture 441. The granulate 49 is held inwardly and outwardly by vertical columns 441 and 442 respectively. It is poured into the basket 44 up to the level 49'.

The reformer 4 need only be designed for a portion of the reforming if the gas-side electrodes of the fuel cells are equipped with catalytically active materials by means of which the reforming can be continued.

There are a large number of parameters that can be freely chosen. For example, the type of material for the catalyst carrier, the type of the catalytically active coating, the porosity of the carrier, the geometry (outer and inner diameter of the porous tube, relationship to the diameter of the central cavity) can all be varied. This enables a brand spectrum of applications for different fuels and operating characteristics. Through the choice of the geometry the amount of heat which can be transferred can be set within a very wide range.

The exemplary embodiments described relate to plants in which exhaust gas is fed back into the reformer. The invention however also refers to plants in which no exhaust gas feedback is provided (such as is the case in the initially named EP-A 0 780 917).

What is claimed is:

1. A power plant with high temperature fuel (20) cells for producing electrical power from gaseous or liquid fuel (50) supplied to the fuel cells, comprising:

a stack (2) of a plurality of high temperature fuel cells (20), each fuel cell (20) being planar, disposed about a common axis, and defining in conjunction with adjacent fuel cells a central cavity in the stack (2);

a tube-shaped reformer (4) arranged in the central cavity of the stack for an endothermic conversion of the fuel at least partially into CO and $H_2$ in the presence of $H_2O$ whereby the heat required for the endothermic conversion of fuel can be at least partially radiated to the reformer (4) from the fuel cells (20);

a supply point (5) for the fuel (50) to one end of the reformer for introducing fuel for the endothermic conversion;

each high temperature fuel cell including a peripheral inlet (81) for air (80), an electrochemically active plate (21) for exothermically producing electrical power from the air and the fuel and an inter-connector (22) for connecting electrochemically active plates of adjacent fuel cells in an electrically conductive manner;

the inter-connector (22) defining a heat exchanger for receiving the air (80) from the periphery of the stack of fuel cells, channeling the air radially inward whereby the air is preheated and channeling the air radially outward whereby the air is contacted with the adjacent electrochemically active plate;

an afterburner chamber (6) for further burning of the fuel with the air flowing out of the high temperature fuel cells, the afterburner chamber (6) surrounding the stack of high temperature fuel cells (20) and bounded by an air-permeable wall (31) for receiving heat from the afterburner chamber (6) to preheat air passing through the air permeable wall for passage to the peripheral inlet (81) of the high temperature fuel cells.

2. The power plant according to claim 1 wherein the reformer (4) includes a central inner surface that carries a catalyst.

3. The power plant according to claim 2 and wherein a flow resistance along the inner surface is less than that radially through the catalyst.

4. The power plant according to claim 1 and wherein the reformer is a porous tube that is manufactured from open-pored foam structure (40a).

5. The power plant according to claim 1 and wherein the reformer (4) is fitted together with a stack of elements (44), these elements being baskets containing granulate (49) which is formed as a catalyst carrier.

6. The power plant according to claim 1 wherein the reformer (4) is provided for a liquid fuel (50) which is supplied as an aerosol spray (56').

7. The power plant according to claim 1 wherein the reformer (4) defines a central conduit with outer and inner cocentric zones (40b and 40a respectively) with the outer zone producing a greater flow resistance than the inner zone and the inner zone being formed as a droplet precipitator.

8. The power plant according to claim 1 and further comprising the reformer (4) consisting of a bundle of vertical tubes (41, 43).

9. The power plant according to claim 8 and wherein the volume of the central cavity forming the reformer (4) is greater than the total volume of tubes so that a substantially uniform distribution over the high temperature fuel cells (20) of the fuel (57) occurs.

10. The power plant according to claim 1 and wherein the reformer (4) is designed for only a part of the reforming and the gas-side electrodes of the fuel cells (20) are provided with catalytically active materials.

11. The power plant according to claim 1 further comprising a catalyst supplied to the reformer (4), the catalyst selected from the group consisting of platinum, palladium, ruthenium, rhodium, nickel, and mixtures thereof.

* * * * *